US012640521B2

(12) United States Patent
Chen et al.

(10) Patent No.: US 12,640,521 B2
(45) Date of Patent: May 26, 2026

(54) INSERT FOR A CONNECTOR

(71) Applicant: HARTING ELECTRIC STIFTUNG & CO. KG, Espelkamp (DE)

(72) Inventors: Yongjun Chen, Zhuhai (CN); Yingtao Wang, Zhuhai (CN)

(73) Assignee: HARTING ELECTRIC STIFTUNG & CO. KG, Espelkamp (DE)

( * ) Notice: Subject to any disclaimer, the term of this patent is extended or adjusted under 35 U.S.C. 154(b) by 293 days.

(21) Appl. No.: 18/264,731

(22) PCT Filed: Jan. 31, 2022

(86) PCT No.: PCT/DE2022/100085

§ 371 (c)(1), (2) Date: Aug. 8, 2023

(87) PCT Pub. No.: WO2022/171241

PCT Pub. Date: Aug. 18, 2022

(65) Prior Publication Data

US 2024/0055807 A1 Feb. 15, 2024

(30) Foreign Application Priority Data

Feb. 9, 2021 (CN) ........................ 202110176799.X

(51) Int. Cl.
*H01R 13/6597* (2011.01)
*H01R 13/652* (2006.01)

(52) U.S. Cl.
CPC ....... *H01R 13/652* (2013.01); *H01R 13/6597* (2013.01)

(58) Field of Classification Search
None
See application file for complete search history.

(56) References Cited

U.S. PATENT DOCUMENTS 11,239,610 B2 * 2/2022 Edenhofer ........... H01R 13/652
2019/0393652 A1 12/2019 Edenhofer et al.

FOREIGN PATENT DOCUMENTS

DE 102010022690 A1 * 12/2011 ........... H01R 13/652
DE 102017108162 A1 10/2018

OTHER PUBLICATIONS

International Search Report and Written Opinion, mailed May 12, 2022 for International Patent Application No. PCT/DE2022/100085. (10 pages) (with English translation of International Search Report).

(Continued)

*Primary Examiner* — Felix O Figueroa
(74) *Attorney, Agent, or Firm* — Seed Intellectual Property Group LLP

(57) ABSTRACT

An insert for a connector, said insert is provided having: an insert housing, a cavity of the insert housing having a plurality of connection accommodating holes for accommodating a plurality of connections, and the plurality of connections comprising at least one protective earthing connection; and a protective earthing plate which is attached to the outer surface of the insert housing in order to electrically contact the protective earthing connection. The insert can accommodate more connections, thereby providing a high-density connector; moreover, it is possible to use power connections and protective earthing connections of the same type in order to allow for quick assembly and disassembly, and customers can replace the connections according to actual use.

10 Claims, 4 Drawing Sheets

(56) References Cited

OTHER PUBLICATIONS

International Preliminary Report on Patentability, dated Aug. 15, 2023, for International Patent Application No. PCT/DE2022/100085. (7 pages).

* cited by examiner

INSERT FOR A CONNECTOR

BACKGROUND

Technical Field

Embodiments of the present disclosure relate to a connector, such as a crimp connector.

Description of the Related Art

Existing connectors, such as, for example, crimp connectors, accommodate in the interior multiple connections, comprising power connections, protective grounding (PE) connections and coding connections. Owing to the space limitations and the relatively large protective grounding connections, relatively few connections can be accommodated in the plug-in connector. Since the type of the PE connection used normally differs from that of the power connection, it is additionally necessary for technicians to use a screw to fasten the PE connection, which leads to a very laborious installation.

BRIEF SUMMARY

Embodiments provide an insert for a connector, wherein the insert can accommodate more connections, whereby a high-density connector is provided, wherein power connections and protective grounding connections of the same type can be used in order for quick assembly and disassembly to be realized, whereby it is also possible for customers to replace the connections according to actual use.

In some embodiments, an insert for a connector is provided, the insert comprising: an insert housing, wherein a cavity of the insert housing has multiple connection-accommodating holes for accommodating multiple connections, and wherein the multiple connections comprise at least one protective grounding connection; and a protective grounding plate, which is attached to the outer surface of the insert housing for electrical contact with the protective grounding connection.

In an advantageous embodiment, the multiple connections furthermore comprise power connections and coding connections; wherein the power connections and the protective grounding connections are the same type of connection.

A particular advantage is to simplify the installation of the protective grounding connections in the insert housing through additional provision of the protective grounding plate, whereby the power connections can be used as protective grounding connections. Since normal power connections can be used as grounding protection connections, relatively more connections can be accommodated in the insert housing.

In an advantageous embodiment, the protective grounding plate comprises a central portion and two side-wing parts which are convexly curved from two mutually oppositely situated respective sides of the central portion, wherein the central portion has a screw hole for screwing-in of a screw.

In an advantageous embodiment, there are integrally formed on the two side-wing parts in each case at least two projections, wherein each projection is provided with a respective window. In some embodiments, each side-wing part comprises two projections which are situated at its two ends.

In an advantageous embodiment, an arm is integrally formed on one of the two projections, wherein the movable end of the arm has a bending portion. Advantageously, the arm may extend in a plane in which the projections are situated, wherein the bending portion and the plane include an angle.

In other advantageous embodiments, the arm may be separately formed directly on the side-wing part. In other words, the arm and the projections are arranged separately from one another.

In an advantageous embodiment, the outer surface of a side of the insert housing that is used for attaching the protective grounding plate is designed in such a way that said outer surface is in form-fitting engagement with the protective grounding plate.

In an advantageous embodiment, the outer surface of a side of the insert housing that is used for attaching the protective grounding plate has a central cutout, which is used for accommodating the central portion of the protective grounding plate, and two rib parts, which are situated on the two sides of the central cutout and latch to the respective side-wing parts of the protective grounding plate.

In an advantageous embodiment, the outer side walls of the two rib parts each have at least two locking noses and one opening, wherein the locking noses can be inserted into the window of the projection part, and wherein the bending portion of the arm can project into the opening.

Advantageously, the outer side walls of the rib parts each have two locking noses which are in each case situated at the two ends of the rib parts, wherein the opening is situated between the two locking noses.

In an advantageous embodiment, the rib part has a protective grounding connection-accommodating hole which is connected to the opening; wherein, by way of the opening, the bending portion can contact the protective grounding connections which are accommodated in the protective grounding connection-accommodating hole.

Advantageously, an electrical connection between the protective grounding connection and the protective grounding plate is established in that the protective grounding connection comes into contact with the bending portion of the arm of the protective grounding plate. Between the screw and the protective grounding plate, an electrical connection is established in that the screw is screwed into the screw hole of the central portion of the protective grounding plate. In this way, a grounding connection between the protective grounding connection and the screw is established via the protective grounding plate. Furthermore, the cover is fastened to the insert housing by the screw in order to establish a grounding connection between the cover and the protective grounding connection.

In an advantageous embodiment, the multiple connections comprise 13 power connections and one or two protective grounding connections. In some embodiments, the multiple connections comprise at least one coding connection, such as one or two coding connections.

Advantageously, different numbers of the connections may be accommodated in the insert through the spatial arrangement.

BRIEF DESCRIPTION OF THE SEVERAL VIEWS OF THE DRAWINGS

Embodiments of the present invention are illustrated in the figures and explained in more detail below.

DETAILED DESCRIPTION

Aspects of the present invention are explained in more detail below in conjunction with embodiments and reference to the figures. In the description, identical or similar reference signs indicate the same or similar components. The following explanations of the embodiments of the present invention in conjunction with the figures are used for explaining the overall concept of the present invention and are not intended to be understood as limiting the present invention.

Figure 1:
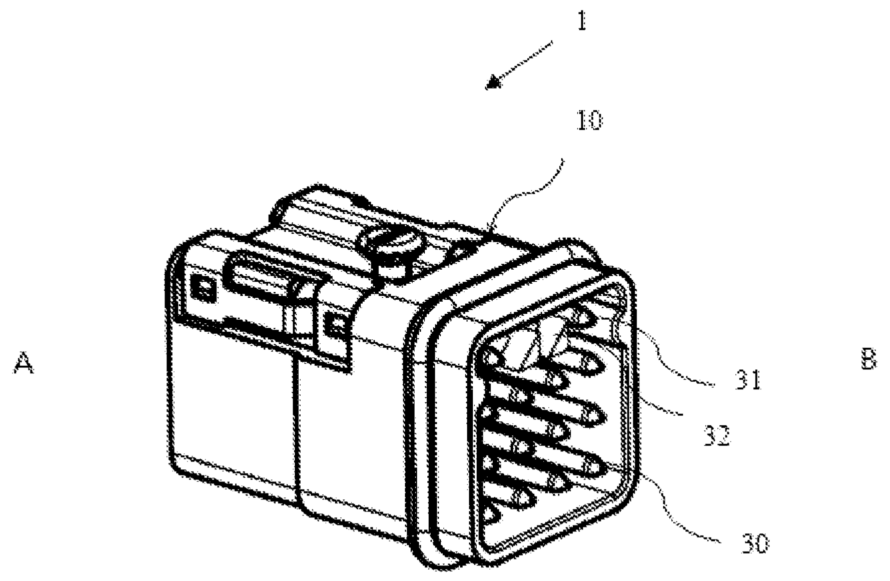
FIG. 1 shows a perspective view of an insert in one embodiment of the present disclosure, wherein a plug-in connection is accommodated in the insert.
Figure 2:
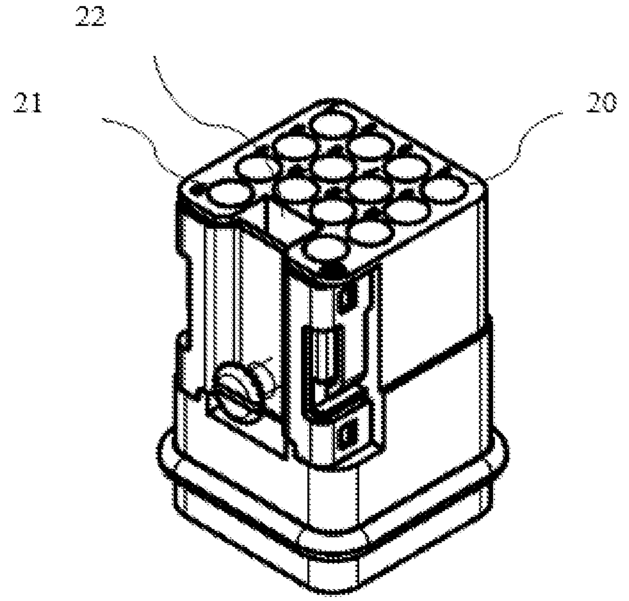
FIG. 2 shows a perspective view of the insert as per FIG. 1 rotated through 90°.

FIG. 1 shows a perspective view of an insert for a connector in one embodiment of the present invention. The connector is implemented in particular as a crimp connector, comprising a cover (also referred to as outer shell and not illustrated) and an insert which is accommodated in the cover. As illustrated in FIG. 1, the insert 1 comprises an insert housing 10 which is produced from plastic. The insert housing is of cuboidal form and has a connection side A and a plug-in side B. The direction from the connection side A to the plug-in side B is referred to as plug-in direction. The insert housing 10 has four side surfaces oriented parallel to one another, specifically a top side and a bottom side along with a front side and a rear side, which, for reasons of clarity, are not marked. The cavity of the insert housing 10 has in the interior multiple connection-accommodating holes (see FIG. 2). In FIG. 2, 14 holes are illustrated, and it goes without saying that the number of holes is not limited thereto. Each connection-accommodating hole has in each case one connection. Thus, multiple connections are accommodated in the insert housing 10, the number of these provided being 14 in FIG. 2. It goes without saying that the number of connections is not limited thereto. Here, the connection is a plug connection. Thus, the insert 1 is a plug insert, while the connector is a plug connector. The connection comprises a power connection 30, a protective grounding (PE) connection 31 (hereinafter written in shortened form as PE connection), and a coding connection 32. Here, the power connection and the PE connection may be of the same type, such as, for example, a standard HAN E crimp connection with a cross-sectional area of 2.5 $mm^2$. The multiple connections comprise at least one PE connection, for example, one or two PE connections. Accordingly, the connection-accommodating holes comprise a power connection-accommodating hole 20, a protective grounding (PE) connection-accommodating hole 21 (hereinafter referred to as PE connection-accommodating hole 21), and a coding connection-accommodating hole 22.

Figure 3:
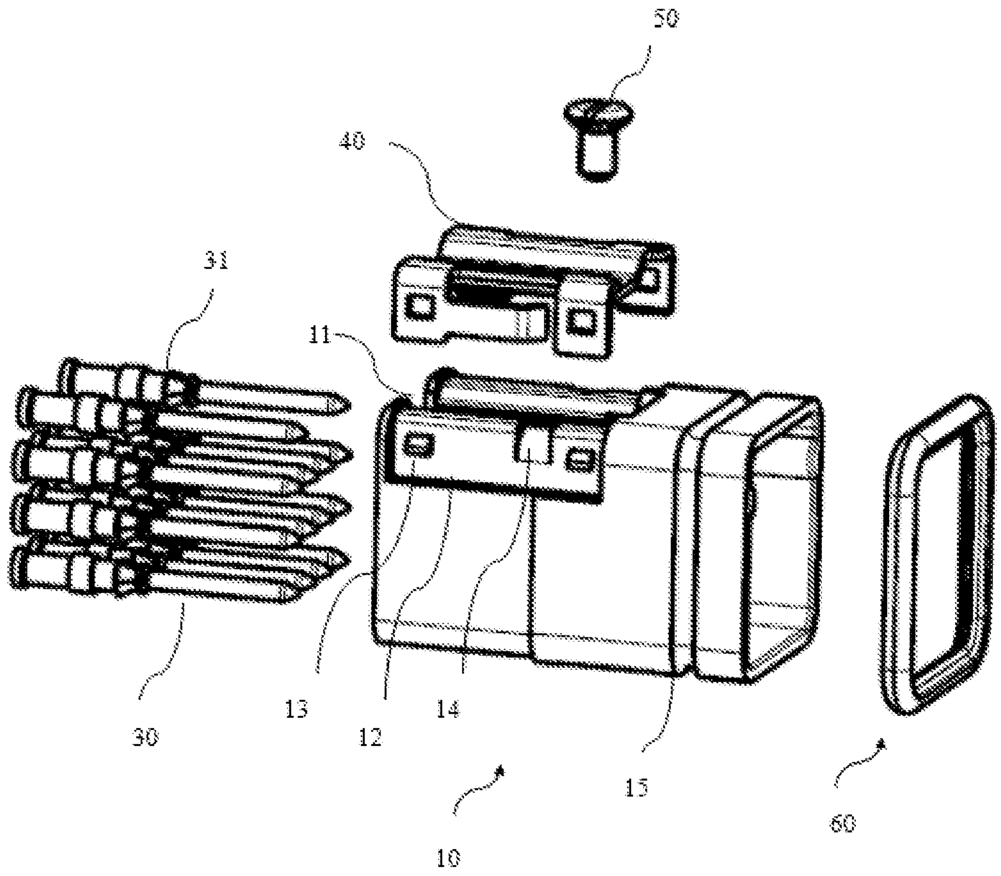
FIG. 3 shows an exploded view of the insert as per FIG. 1.

FIG. 3 shows an exploded view of an insert as per FIG. 1. The main components of the insert are explained in more detail in conjunction with FIG. 3.

A peripheral groove for accommodating a sealing element 60 is formed at an outer periphery, facing toward the plug-in side B, of the insert housing 10. The outer surface of one side (top side as per FIG. 3) of the insert housing 10 has in the region of the connection side A a central cutout 11 which extends from the connection side A to the plug-in side B and which has a cross section which is of substantially U-shaped form. The two sides of the central cutout 11, specifically the two sides along the plug-in direction, have two rib parts 12, wherein the outer surface of the rib parts 12 is recessed relative to the outer surface of the insert housing. In particular, the upper surface of the rib part 12 is recessed in a downward direction relative to the surface of a side of the insert housing on which the rib part is situated, while the outer side surface of the rib part 12 is recessed in an inward direction relative to the surface of a side of the insert housing on which the rib part is situated, in order to provide an installation space for the protective grounding plate 40 (discussed in more detail below). The two rib parts 12 have in the interior connection-accommodating holes in each case, wherein one or two connection-accommodating holes may be arranged as PE connection-accommodating holes 21. The side surface of the rib part 12 has at least two locking noses 13 and one opening 14, wherein the opening 14 is situated between the two locking noses 13 and is connected to the PE connection-accommodating holes 21.

Figure 4:
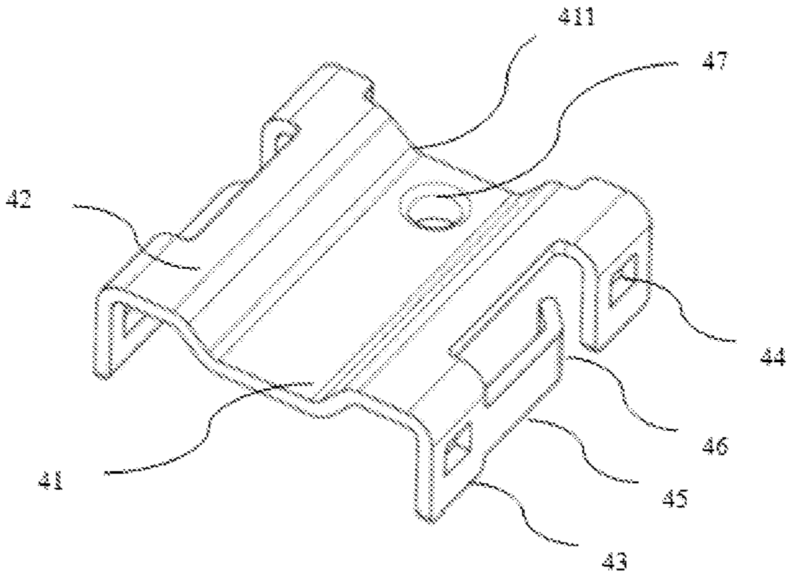
FIG. 4 shows a view of a protective grounding plate.

The specific structure of the protective grounding (PE) plate 40 (hereinafter written in shortened form as PE plate) is illustrated in FIG. 4. The PE plate 40 consists of a metal material such as copper or a copper alloy and may be integrally formed. The PE plate 40 is of elastic form. The PE plate 40 comprises a central portion 41 which is of flat form and which has a screw hole 47 close to one end and which has two side-wing parts 42 which are convexly curved from the two sides 411, that is to say from the longitudinal sides of the central portion 41. The side-wing part 42 is formed with an inverted U shape, wherein one side of the U shape is integrally formed with the central portion and the other side forms at least two projections 43. A window 44 is arranged in the projection 43. An arm 45 is integrally formed on one of the two projections 43, wherein a fixed end of the arm is integrally formed with the projection 43, and wherein a movable end has a bending portion 46 which bends inward and which is provided in the form of a contact piece. A person ordinarily skilled in the art in this field can recognize that the arm 45 may be separately formed directly on the side-wing part 42.

Referring again to FIG. 1, the PE plate 40 may be snapped into place on the outer surface of the insert housing 10, that is to say both parts are in form-fitting engagement. The central portion 41 of the PE plate 40 is accommodated in the central cutout 11 of the insert housing 10 and is outwardly exposed. The central portion 41 may be recessed relative to the surface of a side of the insert housing 10 on which the central portion is situated, in order to provide an installation space for the screw. The space formed between the central portion 41 and the bottom of the central cutout 11 may be used for accommodating the coding connections 32. The two side-wing parts 42 of the PE plate 40 are snapped into place on the two rib parts 12 of the insert housing 10, wherein the locking noses 13 of the rib parts 12 project into the window 44 of the projections 43 of the side-wing part 42 in order to fasten the PE plate 40 to the insert housing 10. When the PE connection 31 has been inserted into the PE connection-accommodating hole 21 of the rib part 12, the flexible portion 46 of the arm 45 of the side-wing part 42 contacts the PE connection 31 via the opening 14 of the side surface of the rib part 12 in order to establish an electrical connection between the PE connection 31 and the PE plate 40. It is then possible for the screw 50 to be screwed into the screw hole 47 of the central portion 41 of the PE plate 40 from above in order to establish an electrical connection between the screw and the PE plate 40. A grounding connection between the PE connection 31 and the screw is established through the PE plate 40 at the end. Furthermore, the screw can fasten the cover (not illustrated) to the insert housing 10 in order to establish a grounding connection between the PE connection 31 and the cover.

Figure 5:
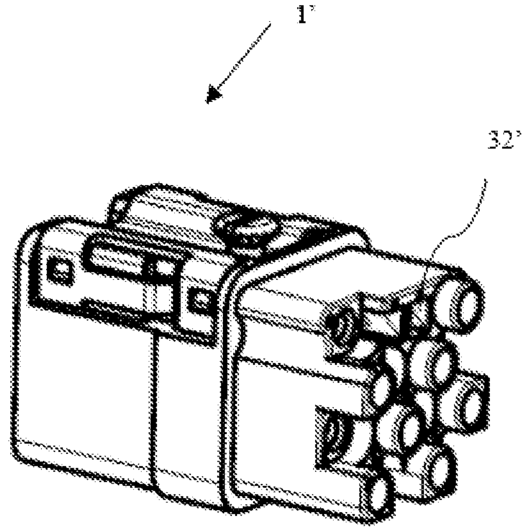
FIG. 5 shows a stereoscopic diagram of an insert in another embodiment of the present invention, wherein a socket connection is accommodated in the insert.
Figure 6:
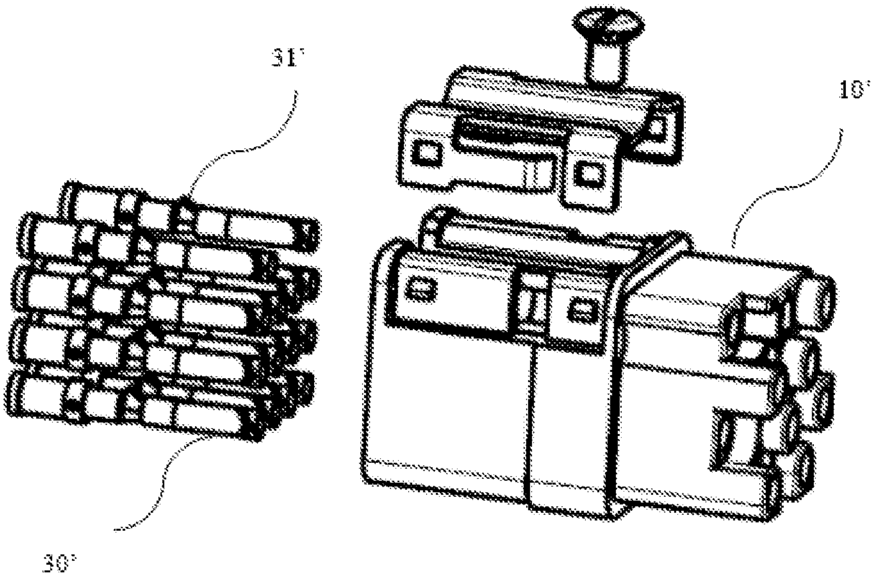
FIG. 6 shows an exploded view of the insert as per FIG. 5.

FIGS. 5 and 6, respectively, show a perspective view and an exploded view of an insert 1' in another embodiment of the present invention. The insert 1' is substantially the same as the insert 1 as per FIG. 1, and identical components acquire the same reference signs. The only main difference is that the insert housing 10' accommodates the socket connections 30', 31', 32' in the interior, whereby the insert is referred to as a socket insert, and a connector which uses the insert becomes a socket connector.

For a person ordinarily skilled in the art in this field, it is clear that the present invention is not limited to the details of the illustrated embodiments. Furthermore, the present invention may be realized by other embodiments. For example, aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An insert for a connector, comprising:

an insert housing, wherein a cavity of the insert housing has multiple connection-accommodating holes for accommodating multiple connections, wherein the multiple connections comprise at least one protective grounding connection, and wherein the insert housing includes a respective opening provided in each of opposing exterior sidewalls of the insert housing that provide access to the at least one protective grounding connection, wherein the openings are distinct from each other and separated from each other by material of the insert housing; and a protective grounding plate having opposing contact arms, wherein the protective grounding plate is attached to an outer surface of the insert housing with the opposing contact arms of the protective grounding plate extending from a location external to the opposing exterior sidewalls of the insert housing inwardly through the openings provided in the opposing exterior sidewalls of the insert housing to a location internal to the exterior sidewalls of the insert housing to make electrical contact with the at least one protective grounding connection.

2. The insert for a connector as claimed in according to claim 1, wherein the multiple connections further comprise power connections and coding connections, and wherein the power connections and the at least one protective grounding connection comprise a same type of physical structure.

3. The insert for a connector according to claim 1, wherein the multiple connections comprises thirteen power connections and one protective grounding connection or twelve power connections and two protective grounding connections.

4. The insert for a connector according to claim 1, wherein the protective grounding plate comprises a central portion and two side-wing parts which are convexly curved from two mutually oppositely situated respective sides of the central portion, and wherein the central portion has a screw hole for accommodating a screw.

5. The insert for a connector according to claim 4, wherein the two side-wing parts each form at least two projections, and wherein each projection is provided with a respective window.

6. The insert for a connector according to claim 5, wherein a respective one of the opposing contact arms is integrally formed on one of the two projections of a respective one of the two side-wing parts, and wherein a movable end of the contact arm has a bent portion.

7. The insert for a connector according to claim 6, wherein an outer surface of a side of the insert housing that is used for attaching the protective grounding plate is designed in such a way that the outer surface is in form-fitting engagement with the protective grounding plate.

8. The insert for a connector according to claim 7, wherein the outer surface of the side of the insert housing that is used for attaching the protective grounding plate comprises a central cutout, which is used for accommodating the central portion of the protective grounding plate, and two rib parts, which are situated on opposing sides of the central cutout and latch to the side-wing parts of the protective grounding plate.

9. The insert for a connector according to claim 8, wherein outer side walls of the two rib parts each have at least two locking noses, and wherein the locking noses can be inserted into the windows of the projections of the two side-wing parts.

10. The insert for a connector according to claim 9, wherein the multiple connections comprise at least two protective grounding connections, wherein each rib part has a protective grounding connection-accommodating hole which is connected to a respective one of the openings of the insert housing, and wherein, by way of the opening, the bent portion of an associated one of contact arms can contact an associated one of the at least two protective grounding connections which is accommodated in the protective grounding connection-accommodating hole.

* * * * *